United States Patent [19]

Stittle

[11] Patent Number: 4,939,948
[45] Date of Patent: Jul. 10, 1990

[54] ON THE GO GEAR SHIFTER

[75] Inventor: Kenneth W. Stittle, Brampton, Canada

[73] Assignee: Noma Outdoor Products Inc., Brampton, Canada

[21] Appl. No.: 402,287

[22] Filed: Sep. 5, 1989

[51] Int. Cl.$^5$ .............................................. B60K 41/22
[52] U.S. Cl. ............................ 74/473 R; 74/471 XY; 74/475; 192/3.62
[58] Field of Search ................ 74/473 R, 471 R, 475, 74/471 XY, 533, 376, 372, 377; 192/3.61, 3.62, 3.63, 99 R; 474/32, 47

[56] References Cited

U.S. PATENT DOCUMENTS

| Re. 29,414 | 9/1977 | Prokop | 74/473 R |
| 1,788,899 | 1/1931 | Tenney | 74/473 R |
| 4,146,120 | 3/1979 | Stevens | 192/3.63 |
| 4,610,335 | 8/1986 | Miyazawa et al. | 192/99 R |
| 4,671,378 | 6/1987 | Korrect et al. | 74/471 XY |
| 4,676,350 | 6/1987 | Shinokawa et al. | 74/471 |

FOREIGN PATENT DOCUMENTS 0012837  1/1983  Japan ............................ 74/471 XY Primary Examiner—Leslie A. Braun
Assistant Examiner—Winnie Yip
Attorney, Agent, or Firm—Kenneth M. Garrett

[57] ABSTRACT

On the go gear shifter for a small motorized apparatus such as a snow blower uses a gear shift handle movable along a slot and engageable in detent openings located on laterally opposed sides of the slot. An over-center cam mechanism is provided to bias the handle into the detent openings. The arrangement is advantageous in permitting the detent openings associated with different gear ratios to be closely spaced together.

8 Claims, 2 Drawing Sheets

ON THE GO GEAR SHIFTER

FIELD OF INVENTION

This invention relates to motorized apparatus employing a friction gear drive. Without limitation, such apparatus may be in nature of lawn and garden equipment such as garden tractors, lawn mowers, snow blowers.

BACKGROUND OF INVENTION

It is known to employ "on the go" gear shifters in motorized apparatus, in accordance with which movement of a gear shift handle from a restrained, gear engaged position to a gear changing position simultaneously acts to disengage a clutch, and vice versa. In prior art devices of this nature, the gear changing position is defined by an elongated slot along which the gear shift handle is freely movable. A plurality of detent opening openings are provided in communication with the slot on one transverse side only thereof; each detent opening defines a predetermined gear ratio, and provides the means for restraining movement of the gear shift handle. Where there are no restrictions on the length of the slot, a relatively large number of detent openings that are widely spaced may be provided, and the margin of error in selecting any desired gear ratio is small. However, in certain apparatus there may be limitations to the slot length, and the detent openings are correspondingly arranged closely together, whereby selection between them becomes less certain.

SUMMARY OF THE INVENTION

In accordance with a preferred aspect of this invention, detent openings are provided along both transverse sides of the slot, so increasing the ease and certainty of engaging the gear shift handle in a slot associated with an intended gear ration, while permitting "on the go" shifting.

More broadly expressed, the invention provides in an apparatus including a prime mover, a drive train including a friction gear and a member driven thereby, a gear shift handle and means mounting the gear shift handle for movement along a path for varying the ratio of the gear, a plurality of detent openings locating on transversely opposed sides of the path, the mounting means permitting engagement of the gear shift handle in the detent openings to retain the selected gear ratio; a clutch link movable between first and second positions respectively to couple and uncouple the drive train, an over centre toggle means operatively interconnecting the clutch link and the gear shift handle acting to move the clutch link to the second position as the gear shift handle is moved out of engagement with a detent opening under the influence of a manual force, and to bias the gear shift handle into engagement with the detent openings upon release of the manually applied force, and simultaneously return the lever to the first position.

In accordance with a preferred embodiment of the invention, the toggle means includes a cam and follower, the latter suitably being mounted to a lever to which the clutch link is connected. Suitably the toggle means includes a gate having a slot in which the gear shift handle is captured and along which slot the gear shift handle is movable for purposes of changing the gear ratio, but which moves with the gear shift handle as the latter moves into and out of engagement with the detent openings. Preferably the cam is integrally connected with the gate and mounted for pivotal movement. Accordingly, manual movement of the gear shift handle from a detent opening will rotate the cam, and rotation of the cam under the influence of the cam follower will move the gear shift handle into engagement with a detent opening.

These foregoing objects and aspects of the invention, together with other objects, aspects and advantages thereof will be more apparent from the following description of a preferred embodiment thereof, taken in conjunction with the following drawings.

DESCRIPTION OF THE PREFERRED EMBODIMENT

Figure 1:
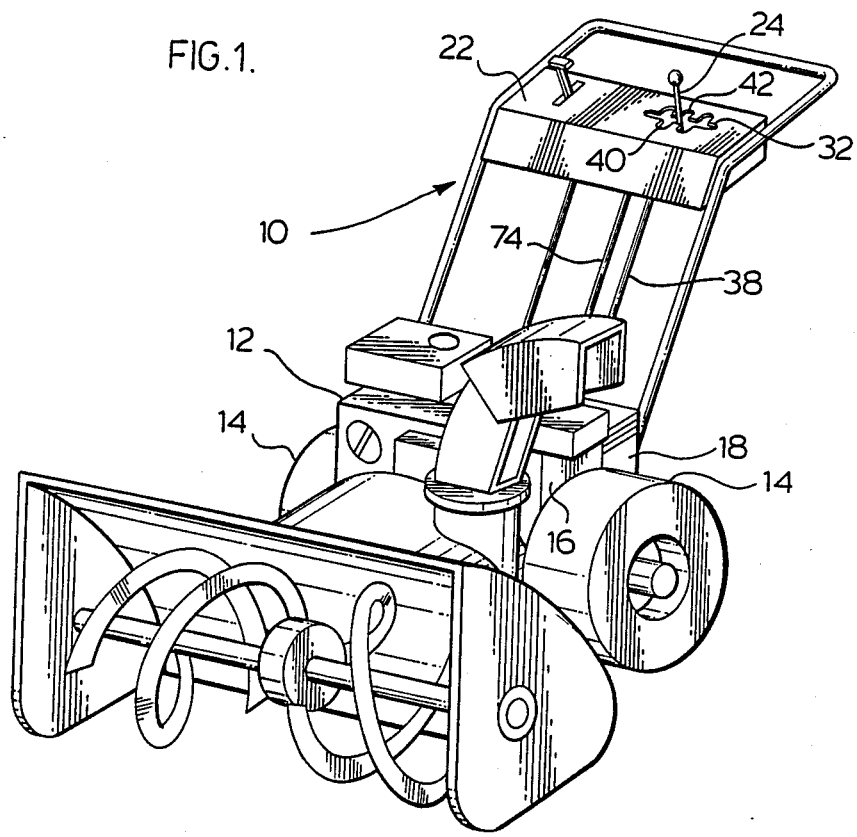
FIG. 1 illustrates a motorized apparatus of the type incorporating the instant invention.
Figure 2:
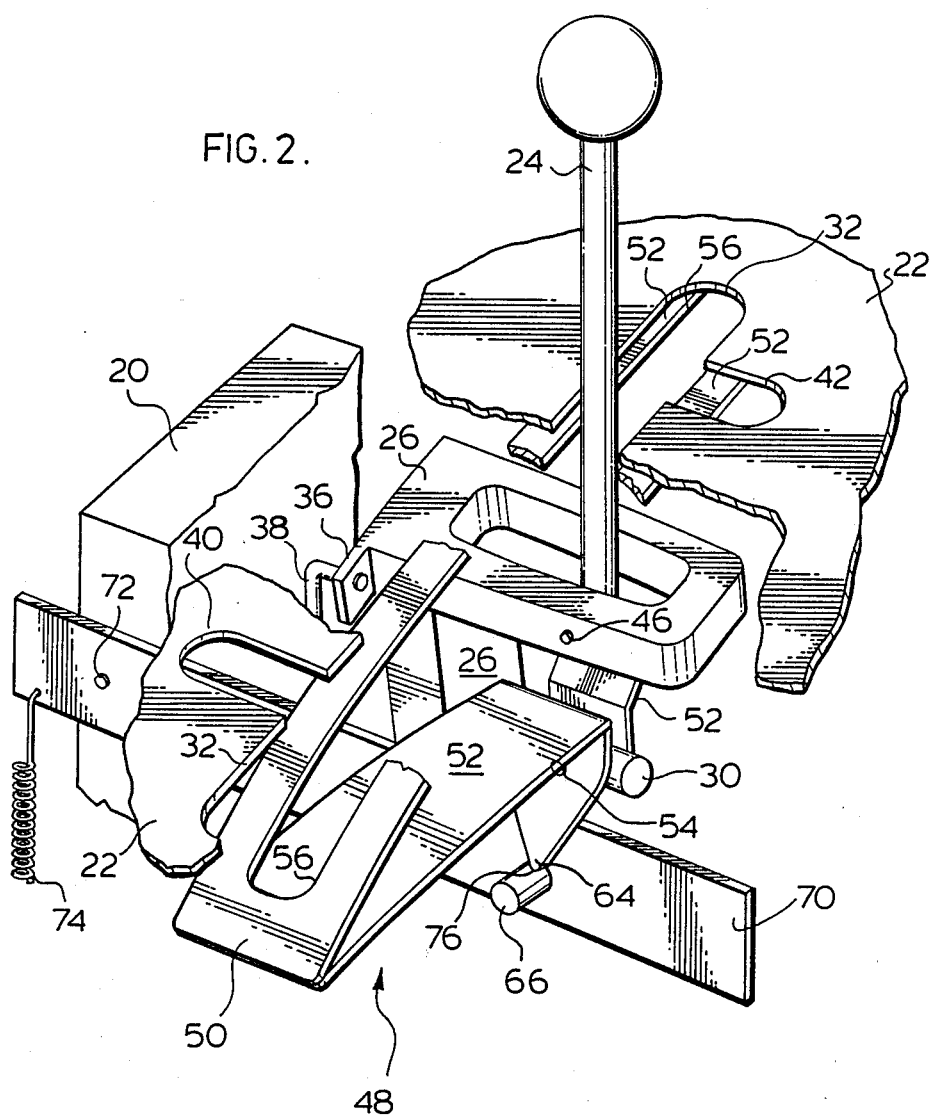
FIG. 2 shows an "on the go" gear shift handle mechanism in accordance with the invention in isometric view broken away to reveal detail.

Referring to the drawings in detail, a motorized apparatus embodying the invention is identified by the numeral 10, and comprises a motor 12, wheels 14 and a drive train including a friction gear drive 16 and clutch 18, interconnecting the motor and wheels, all supported from apparatus frame 20 and shown somewhat schematically in FIG. 1.

Apparatus 10 includes a control console 22 having a gear shift handle 24 operable thereon to select an appropriate gear ratio for driving wheels 14. Gear shift handle 24 is mounted from a carriage 26, which in turn is mounted for rotation about an axle 30 rigidly secured to frame 20. Console 22 is provided with an elongated slot 32 therein in a plane orthogonal to the vertical plane in which axle 30 resides, to permit gear shift handle 24 and carriage 26 therewith, to move rotationally about axle 30. Such movement is transmitted via ear 36 and link 38 to drive 16, to vary the gear ratio of the friction gear in a well known manner. Slot 32 is provided with a first plurality of detent opening 40 in communication with one transverse side thereof, and a second plurality of detent opening 42 in communication with the opposed transverse side thereof. Gear shift handle 24 is mounted from carriage 26 by a pintle 46, which permits the gear shift handle to rotate independently of the carriage in a direction transverse to the axis of rotation of the carriage. Accordingly, gear shift handle 24 may be freely moved along slot 32 to select an appropriate gear ratio, and engaged in a detent opening to retain the selected gear ratio.

Gear shift handle 24 is biasd towards detent openings 40, 42 by an over centre toggle mechanism 48 including a gate 50 which underlays console 22, and brackets 52 which are hinged to axle 30 by a hinge pin 54 parallel to pintle 46. Gate 50 has an elongated slot 56 therein having a similar axial extent to console slot 32, and through the gear shift handle 24 extends slot and console slot. Toggle mechanism 48 further comprises a cam 64 which connects to the lower end of one bracket. A cam follower 66 is carried on a lever 70 which is connected to frame 20 at pivot 72. A clutch control cable 74 connects to lever 70, and biases follower 66 into contact with cam 64.

Cam 64 is symmetrical on each side of a high point 76 that is in contact with follower 66 when gear shift handle 24 locates out of engagement with detent opening 40 or 42, in which position lever 70 is urged to a position to disengage clutch 18. Cam 64 is in a metastable condition when follower 66 is in contact with high point 76, and follower 66, under the urging of the biasing force transmitted by clutch control cable 74, acts to toggle cam 64, and gate 50 therewith into a stable condition on either side of the high point, thereby biasing gear shift handle 24 into a detent opening 40 or a detent opening 42 as desired by a operator. As cam follower 66 rides up cam 64 on either side thereof, lever 70 pivots to a position to engage clutch 18. As a corollary, assuming gear shift handle 24 to be engaged in a detent opening 40 or 42, the application of a manual force by the operator in a sense to move the gear shift handle out of the detent opening will cause a corresponding rotation of cam 64, entraining depression of follower 66 and the opening of clutch 18, permitting the gear ratio of drive 16 to be varied.

It will be apparent that many changes may be made to the illustrative embodiment, while falling within the scope of the invention and it is intended that all such changes be covered by the claims appended hereto.

I claim:

1. In an apparatus including:
   a prime mover;
   a drive train including a friction gear and a member driven thereby;
   a gear shift handle;
   means mounting said gear shift handle for movement along a path for varying the ratio of said friction gear;
   a plurality of detent openings locating along said path, said mounting means permitting the engagement of said gear shift handle into selected detent openings for retaining selected gear ratios;
   a clutch link movable between first and second positions respectively to couple and uncouple said driven member from said drive train;
   the improvement wherein ones of said detent openings locate on transversely opposed sides of said path, and wherein over-centre toggle means is provided operatively interconnecting said clutch link and said gear shift handle so as to move said clutch link to said second position as said gear shift handle is moved out of engagement with a detent opening under the influence of a manually applied force, and to bias said gear shift handle into said detent openings upon release of said manually applied force, while simultaneously permitting the return of said clutch link to said first position.

2. Apparatus as defined in claim 1 wherein said over centre toggle means includes a cam and a follower.

3. Apparatus as defined in claim 2, wherein said follower is mounted on a lever to which said clutch link is connected.

4. Apparatus as defined in claim 1, wherein said over centre toggle means includes a gate having a slot therein in which said gear shift handle is captured.

5. Apparatus as defined in claim 4, wherein said over centre toggle means further includes a cam integral with said gate.

6. Apparatus as defined in claim 1, wherein said means mounting said gear shift handle comprises a carriage mounted for rotary movement about an axle, and wherein said path locates in a plane perpendicular to said axle.

7. Apparatus as defined in claim 6, wherein said gear shift handle is pivotally mounted to said carriage to permit movement of said gear shift handle into and out of engagement with said detent openings in planes containing said axle.

8. Apparatus as defined in claim 1, wherein said path is defined by a slot in a fixed console portion of said apparatus and wherein said detent openings are formed in said console in communication with said slot.

* * * * *